UNITED STATES PATENT OFFICE 2,514,647

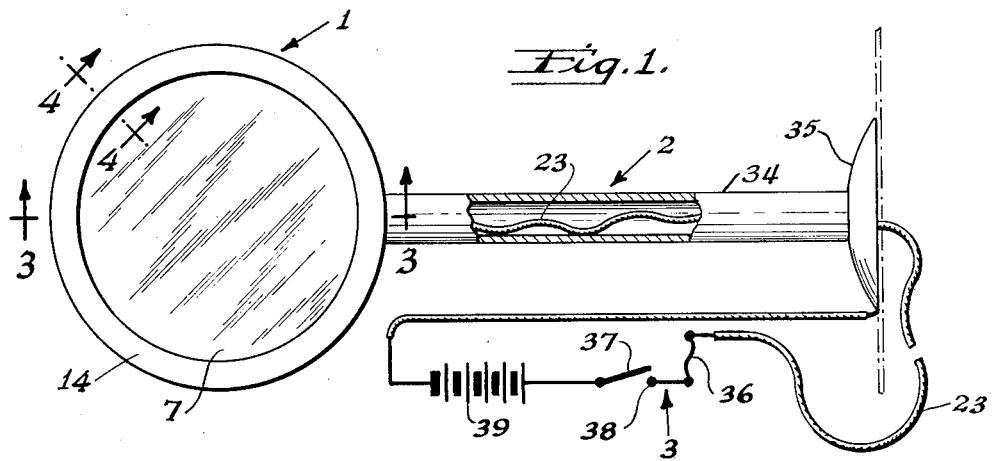
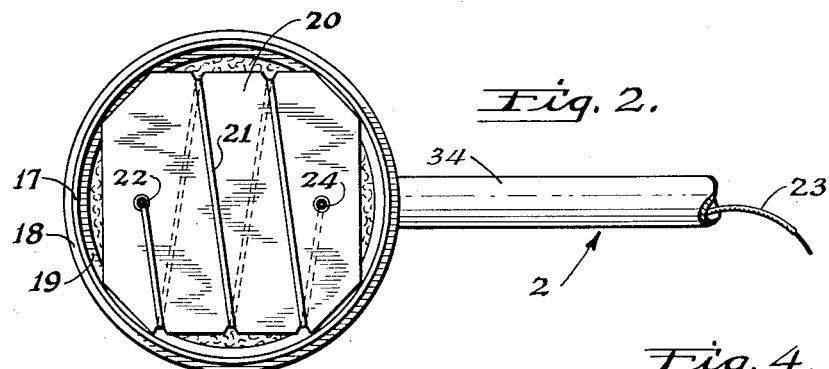
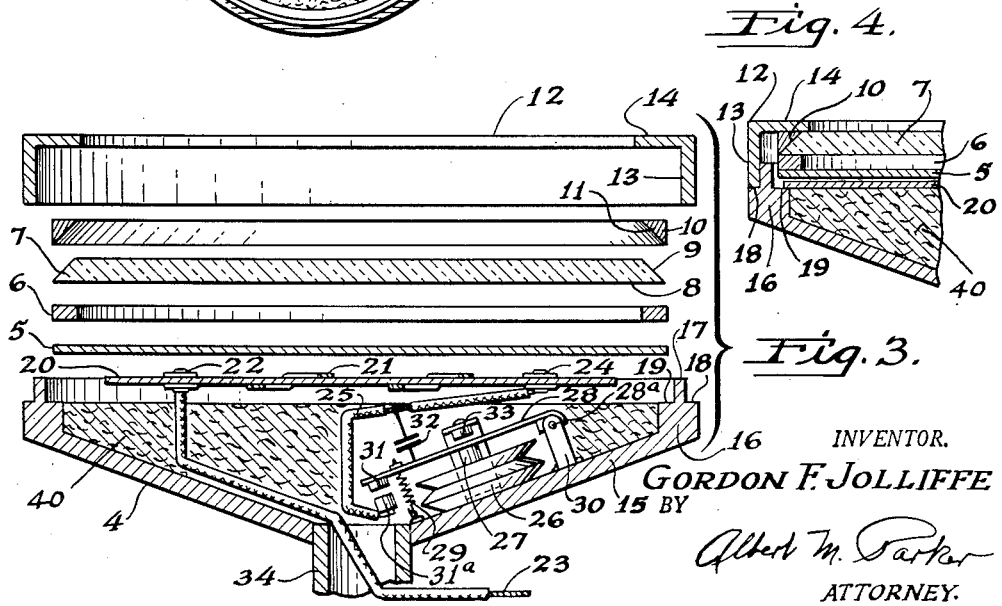

REARVIEW MIRROR SYSTEM FOR VEHICLES

Gordon F. Jolliffe, Bernardsville, N. J.

Application March 16, 1948, Serial No. 15,185

5 Claims. (Cl. 219—19)

This invention relates to rear view mirror systems for vehicles and more particularly to such systems for maintaining such mirrors clear and usable in spite of atmospheric disturbances.

The laws of many jurisdictions require that vehicles operated on their highways, particularly buses and trucks, be equipped with mirrors outside of the body of the vehicles, so that the driver may have unobstructed rear vision at all times. The wisdom of such provisions, from the safety standpoint, is inescapable, but weather conditions, particularly in the winter, often intervene to avoid the safety factor introduced by the use of such appliances. In other words, a mirror which is rendered unusable by sleet, snow, or other obscuring conditions, is as good as no mirror at all.

Another factor to be overcome is the human element whereby the driver of a vehicle might fail to use such means as were available to him for keeping his rear view mirror clear, if some manual action were necessary to effect the clearing. It is thus essential that some automatic means be provided for keeping the mirror clear, whenever the motor of the vehicle is running. Such means should, in and of itself, be responsive to any changes in the weather which would cause any preventable obscuring of the mirror.

It is accordingly the principal object of this invention to provide a rear view mirror and system for effecting the same which is automatically operable in response to temperature changes.

Another object of the invention is to provide such a system which is put in operable condition as soon as operation of the vehicle is commenced.

Still another object is to provide such a system which is simple, fool-proof, and cannot readily be interfered with by the driver of the vehicle, or any other person.

A further object of the invention is to provide a mirror and operating system which will withstand substantial temperature variations without failure, or destruction.

Other and more detailed objects of the invention will become apparent from the following description of the embodiment of the invention shown in the accompanying drawing:

In that drawing Figure 1 is an elevation, partly in section, of the mirror system of my invention, with certain of the operating parts of the system being shown schematically.

Figure 2 is an elevation of the housing portion of my mirror mounting shown with the actual mirror and other elements removed in order to display the heating element.

Figure 3 is an enlarged exploded section of my complete mirror mounting, taken on lines 3—3 of Figure 1, and showing the weather responsive control element within the housing.

Figure 4 is a fragmentary section taken on lines 4—4 of Figure 1.

As shown in Figure 1, my mirror mounting, by which term I include the outer casing as well as the elements retained thereby, is generally indicated at 1, the bracket arm for it is generally indicated at 2, and the electrical system, operated in conjunction with the ignition switch of the vehicle, is shown generally at 3. The mirror of my invention is heated, hence the mounting 1 includes several elements for suitably holding the actual mirror member, and, at the same time, protecting it from too intense heat whether general or localized. As the rear part of the mounting, I accordingly provide a housing 4 receiving the heating and temperature control elements. Over the open face of the housing 4 are assembled a mica shield 5, a gasket, or spacing ring, 6, of some suitable material such as asbestos, and the actual mirror member 7. The mirror member 7 is formed of suitable transparent, heat resistant, material such as Pyrex glass, or the equivalent, and is backed with a suitable reflective medium as shown at 8. The outer periphery of the mirror member 7 is preferably beveled at 9 in order to snugly receive a mounting gasket 10 whose inside beveled surface 11 engages the bevel 9 on the member 7. The gasket 10 is formed of suitable material, such as asbestos.

The elements just described as being over the open face of the housing 4 are secured in place on that housing by means of a mounting ring 12. The ring 12 is formed with a side wall 13 and an overlying flange 14. For the manner in which the ring 12 performs its mounting function it is necessary to consider the housing 4 which is seen to have a back 15 in the nature of a flat cone, terminating around its outer periphery in a mounting annulus 16. The enlarged lower portion of the annulus 16 is reduced into an upwardly extending ring 17, located intermediate the outer faces of the said portion 16, thereby leaving shoulders 18 and 19 on either side of the ring 17.

The hollow within the housing 4 receives a heating element and the weather responsive control for the heating element. The first element seated on the shoulder 19 is a mica plate 20. This plate has suitable electrical resistance heating wire 21 passed around it several times and received in suitably formed edge notches as shown in Figure 2. One end of the heating wire 21 makes contact at 22 with an electrical conductor 23, insulated from the housing as shown. The other end of the heating wire 21 makes contact at 24 with the other electrical conduit 25 of the circuit. Only one insulated conduit is needed running back to the source of electricity, such as a battery, for the other side of the line is grounded through the body and frame of the vehicle which serves as the negative lead for the system.

When the mirror mounting and heating elements are assembled, the mica disc 5 is seated over the plate 20 and its heating wire 21, the gasket 6 is seated on top of the disc 5, and the other elements of the mirror mounting are correspondingly stacked as indicated in Figures 3 and 4.

The mounting ring 12 holds the foregoing elements in place on the housing 4. The side wall 13 of that ring just fits over the upstanding collar 17 and engages against the neck 18, as best seen in Figure 4. The securing of the ring 12 in place on the housing 4 may be achieved by some suitable means which should provide a weather proof joint and one of a semi-permanent nature. The actual holding of the elements in place is accomplished by the inwardly extending flange 14, which, in the assembled position of the elements, engages the mounting gasket 10 and thus presses all of the elements down onto the shoulder 19, as shown in Figure 4. All of this assembly is what I refer to as the mirror mounting.

A bellows thermostat 26, is equipped with an operating plunger 27, is seated within the housing 4 and is attached to the inner surface of the back 15. The plunger 27 is positioned to operate upon a pivoted control arm 28, pivoted at 28a to a support, preferably in the form of a pair of spaced arms 30. On the opposite side of the bellows 26 from the support 30, the arm 28 tends to be drawn down by a spring 29, acting between and secured to, the arm 28 and the back 15. As can be seen this spring tends to draw the arm 28 against the plunger 27 and also tends to draw together the pair of contacts 31 and 31a. The first of those contacts is carried by the arm 28 out beyond the position of engagement of the spring 29 therewith. The other contact, 31a, aligned with the contact 31, is on the terminal end of the conduit 25. Flashing of the contact points 31 and 31a as they make and break contact is minimized by the introduction of a contact point condenser 32, bridged between the conduit 25 and the arm 28. Finally, the movement of the arm 28 away from contacting position is stopped by a stop pin 33 suitably mounted by means of an arm, or a yoke on the far side of the arm 28 from the plunger 27.

The conductor 23 after leaving the housing 4, passes through the pipe 34 and from it into the hollow bracket arm 2, emerging from said arm where the same engages at 35 with the body of the vehicle. The conductor 23 is insulated from the body of the vehicle and has in its line a link fuse 36. From the fuse 36 the circuit passes through the ignition switch of the vehicle, generally shown at 3, to the battery 39. The other side of the circuit is grounded to the frame of the vehicle through the arm 28, the support 30, housing 4 and bracket 2. One terminal of the battery is likewise grounded to the frame of the vehicle. Thus when the movable contact 37 of the ignition switch is turned to close the switch against the contact 38, current from the battery 39 will flow through the circuit so long as the contacts 31 and 31a are engaged.

The portion of the housing 4, not taken up by the thermostatically controlled switch and electrical connections, is preferably filled with some suitable material such as asbestos. This material, as shown at 40, is so disposed that it shields the bellows thermostat from the heat given off by the wire 21 without interfering with the operation of the bellows, or other parts of the switch mechanism. This filler material also aids in dampening the effects of vehicle vibration.

Let us assume that a school bus is equipped with a mirror system in accordance with my invention. In the morning the temperature is up to 45°, or higher, a satisfactory temperature at which the bellows 26 may well be in expanded position and still provide the proper margin of safety. With the temperature at 45° the bellows thermostat 26 will thus be expanded so that the plunger 27 will be projected upward, as shown in Figure 3. Hence the action of the spring 29 will be overcome and the contacts 31 and 31a will be parted. Accordingly, even though switch member 37 is in closed position, no current will flow through the resistance heating wire 21.

In the course of the afternoon, the temperature drops, and a drizzling rain sets in. By the time the driver picks up the school children to take them home, the temperature has dropped to where, at least on the hilly parts of his trip, the drizzle is freezing. Making frequent stops, pulling off to the side of the road, and passing out again into the highway, it is essential that the driver have clear vision to the rear. So long, however, as his bus is equipped with a mirror system, in accordance with this invention, he will have that vision. Already, and as soon as the temperature dropped below 45°, the bellows thermostat 26 will have retracted and the plunger 27 will consequently have been drawn down so that the spring 29 can bring the contacts 31 and 31a together. As soon then as the driver turns on the ignition switch of the vehicle, thereby closing the contact of member 37 against member 38, current will flow through the system and through the resistor wire 21. The wire 21 will, accordingly, heat up to sufficient extent to warm the mirror member 7 and keep it clear of ice, moisture, or fog. There is nothing extra the driver has to do, for so long as the ignition switch of the vehicle is on, the mirror system will work automatically.

Even though the device should remain on for a long time, the mirror member is not affected by any direct, or by too intense heat. This is due to the fact that the mica shield 5 and the air space between shield 5 and the mirror member 7 protect the mirror member against any contact with, or too intense heat from, the heating element 21. The annular gasket 6 assures the presence of the air space, and, besides being a poor conductor of heat, lies generally out of contact with the heating wire 21. Likewise the temperature differential between the mirror member 7 and the mounting ring 12 would not particularly affect the mirror, since the principal contact between the two would be through the cushioning and insulating gasket 10.

By making a semi-permanent connection between the mounting ring 12, and its seat 17—18, the likelihood of anyone disturbing the elements of the mirror and, particularly, interfering with its heating system will be minimized. Furthermore, the provision of a good tight joint eliminates the likelihood of moisture, or moist air, getting into the housing and affecting any of the elements within the same. What is to be particularly noted with regard to my mirror mounting and system is that so long as the vehicle equipped with the same is being used, or even is being warmed up ready for use, the mirror will be heated so long as the outside temperature indicates that such is desirable. The driver of the vehicle has nothing to do with it, and needs to do nothing, for it entirely takes care of itself.

The temperature responsive control element could take different forms from that shown, and could, if desired, be mounted outside of the housing, should it be needed to better shield it from the heating action of the electric heating element. I have found, however, that with a proper packing around the type of responsive element shown, the same is not noticeably affected by the action of the heating element.

Since certain changes may be made in the above construction, and different modifications of the invention could be made without departing from the scope thereof, it is intended that all matter contained in the above description, or shown in the accompanying drawing, shall be interpreted as illustrative and not in a limiting sense.

Having described my invention, what I claim as new and desire to secure by Letters Patent is:

1. In a rear view mirror system for vehicles, a mirror, a housing for receiving said mirror, a mounting element engaging said housing and for engaging the exterior of the body of a vehicle for mounting said housing on the exterior of a vehicle heating means within said housing spaced from said mirror, and control means within said housing operable in response primarily to outside temperature to connect and disconnect said heating means from the source of heat said control means being in better heat exchange relationship with said housing than with said heating means.

2. In a rear view mirror system for vehicles, a housing having an open face, a mounting post in engagement with said housing and extending therefrom to mount said housing on the exterior of said vehicle, a mirror mounted in said housing adjacent said open face, a source of heat in said housing behind said mirror, and atmospheric temperature responsive control means within said housing on the remote side of said heat source from said mirror, said control means being connected with said source of heat to turn the same on or off in response primarily to changes in atmospheric temperature and said control means being in better heat exchange relationship with said housing than with said source of heat.

3. In a rear view mirror system for vehicles, a housing, a hollow post engaging said housing for mounting the same on the exterior of a vehicle, an electric current conduit in the hollow of said post, a mirror within said housing, electrical heating means within said housing for heating said mirror, a circuit including said electric current conduit said electrical heating means and a source of current for the same and a pair of control means in said circuit for controlling the current flow through the same, one of said control means being seated in said housing in back of said mirror and being responsive to atmospheric temperature and the other to the operation of the ignition switch of the vehicle.

4. In a system for a rear view mirror mounted on the exterior of a vehicle, which vehicle is equipped with an ignition system, a hollow housing open on one face, a pipe engaged with said housing for mounting the same on the exterior of a vehicle, the interiors of said housing and said pipe being in communication with each other, a mirror mounted within said housing to close the open face thereof, an electrical heating element within said housing behind said mirror and shielded therefrom, an atmospheric temperature responsive element within said housing behind said electrical heating element and shielded from said electrical heating element, electric circuit control means within said housing and mounted for operation by said temperature responsive element, electric current conduits extending from the ends of said electrical heating element, one of said conduits extending through said pipe to the source of current and the other of said conduits being grounded on said housing, said electric circuit control means being interposed in one of said conduits.

5. A system as in claim 4 and including a circuit formed by said conduits, said circuit including the ignition switch of said vehicle.

GORDON F. JOLLIFFE.

REFERENCES CITED

The following references are of record in the file of this patent:

UNITED STATES PATENTS

| Number | Name | Date |
|---|---|---|
| 281,224 | Goodsell et al. | July 10, 1883 |
| 1,934,110 | Wilson | Nov. 7, 1933 |
| 2,006,006 | Zaiger | June 25, 1935 |
| 2,015,816 | Pyzel | Oct. 1, 1935 |
| 2,102,487 | Schwarz | Dec. 14, 1937 |
| 2,111,251 | Spilsbury | Mar. 15, 1938 |